(12) United States Patent
Scott et al.

(10) Patent No.: US 12,744,448 B2
(45) Date of Patent: Sep. 22, 2026

(54) SYSTEMS AND METHODS FOR IMPROVING EFFICIENCY IN A POWER MANAGEMENT CIRCUIT

(71) Applicant: Qorvo US, Inc., Greensboro, NC (US)

(72) Inventors: Baker Scott, San Jose, CA (US); George Maxim, Saratoga, CA (US); Nadim Khlat, Cugnaux (FR); Hui Liu, San Diego, CA (US); David Edward Reed, Calhan, CO (US)

(73) Assignee: Qorvo US, Inc., Greensboro, NC (US)

( * ) Notice: Subject to any disclaimer, the term of this patent is extended or adjusted under 35 U.S.C. 154(b) by 322 days.

(21) Appl. No.: 18/616,740

(22) Filed: Mar. 26, 2024

(65) Prior Publication Data

US 2024/0339918 A1 Oct. 10, 2024

Related U.S. Application Data

(60) Provisional application No. 63/457,245, filed on Apr. 5, 2023.

(51) Int. Cl.
*H02M 1/00* (2007.01)
*H02M 1/44* (2007.01)
*H02M 3/155* (2006.01)

(52) U.S. Cl.
CPC ........... *H02M 1/0048* (2021.05); *H02M 1/44* (2013.01); *H02M 3/155* (2013.01)

(58) Field of Classification Search
CPC ....... H02M 3/155; H02M 1/0048; H02M 1/44
See application file for complete search history.

(56) References Cited

U.S. PATENT DOCUMENTS 6,310,953 B1 * 10/2001 Yoshida ................ H04M 3/007 379/395.01
7,570,033 B1 8/2009 Ju
(Continued)

FOREIGN PATENT DOCUMENTS

CN 112803770 A 5/2021
EP 3780370 A1 2/2021

OTHER PUBLICATIONS

Hwang, Y.-S. et al., "An Improved Optimum-Damping Current-Mode Buck Converter With Fast-Transient Response and Small-Transient Voltage Using New Current Sensing Circuits," IEEE Transactions on Industrial Electronics, vol. 68, No. 10, Oct. 2021, IEEE, pp. 9505-9514.

(Continued)

*Primary Examiner* — Rafael O De Leon Domenech
(74) *Attorney, Agent, or Firm* — Withrow & Terranova, P.L.L.C.

(57) ABSTRACT

Systems and methods for improving efficiency in a power management circuit are disclosed. In one aspect, a ping-pong sample and hold circuit smooth transitions from buck to boost (and vice versa) modes of operation for a direct current-to-direct current (DC-DC) converter in the power management circuit. The ping-pong sample and hold circuit provide a ramp compensation for each clock cycle, where transitions are smoothed by holding the last value used from the previous mode of operation. In a second aspect, a current sensor is used that integrates a current value to provide a base feedback loop for the DC-DC converter and may use various compensation factors to provide a proper ramp signal for the DC-DC converter.

12 Claims, 13 Drawing Sheets

(56) References Cited

U.S. PATENT DOCUMENTS

| | | | | |
|---|---|---|---|---|
| 9,178,382 | B2 * | 11/2015 | Mao | H02J 7/04 |
| 2007/0018624 | A1 | 1/2007 | Guo | |
| 2009/0206805 | A1 | 8/2009 | Choi et al. | |
| 2010/0320992 | A1 | 12/2010 | Dearn | |
| 2014/0253353 | A1 | 9/2014 | Singer et al. | |
| 2016/0352228 | A1 | 12/2016 | Zhang | |
| 2024/0322692 | A1 * | 9/2024 | Zhang | H02M 3/156 |

OTHER PUBLICATIONS

Extended European Search Report for European Patent Application No. 24168774.8, mailed Sep. 25, 2024, 10 pages.

Pooya Forghani-Zadeh, H. et al., "An Accurate, Continuous, and Lossless Self-Learning CMOS Current-Sensing Scheme for Inductor-Based DC-DC Converters," IEEE Journal of Solid-State Circuits, vol. 42, No. 3, Mar. 2007, first published Feb. 26, 2007, IEEE, pp. 665-679.

* cited by examiner

SYSTEMS AND METHODS FOR IMPROVING EFFICIENCY IN A POWER MANAGEMENT CIRCUIT

PRIORITY APPLICATION

This application claims the benefit of U.S. Provisional Patent Application Ser. No. 63/457,245, filed on Apr. 5, 2023, entitled "SYSTEMS AND METHODS FOR IMPROVING EFFICIENCY IN A POWER MANAGEMENT CIRCUIT," the disclosure of which is hereby incorporated herein by reference in its entirety.

BACKGROUND

I. Field of the Disclosure

The technology of the disclosure relates generally to power management circuits, including direct current-to-direct current (DC-DC) converters.

II. Background

Computing devices abound in modern society, and more particularly, mobile communication devices have become increasingly common. The prevalence of these mobile communication devices is driven in part by the many functions that are now enabled on such devices. Increased processing capabilities in such devices mean that mobile communication devices have evolved from pure communication tools into sophisticated mobile entertainment centers, thus enabling enhanced user experiences. With the advent of the myriad functions available to such devices, there has been increased pressure to find ways to reduce power consumption. One way that power consumption has been reduced is to make circuits more efficient. Power management circuits that include direct current-to-direct current (DC-DC) converters are one such circuit where trying to improve efficiency provides opportunities for innovation.

SUMMARY

Aspects disclosed in the detailed description include systems and methods for improving efficiency in a power management circuit. In particular, a first aspect incorporates a ping-pong sample and hold circuit to smooth transitions from buck to boost (and vice versa) modes of operation for a direct current-to-direct current (DC-DC) converter in the power management circuit. The ping-pong sample and hold circuit provide a ramp compensation for each clock cycle, where transitions are smoothed by holding the last value used from the previous mode of operation. In a second aspect, a current sensor is used that integrates a current value to provide a base feedback loop for the DC-DC converter and may use various compensation factors to provide a proper ramp signal for the DC-DC converter.

In this regard, in one aspect, a power management circuit is disclosed. The power management circuit includes a direct current DC-DC converter, a current feedback loop for the DC-DC converter having an output node, a voltage feedback loop for the DC-DC converter coupled to a common output node, a comparator coupled to the output node, a reference voltage, and the DC-DC converter, and a ping-pong ramp compensation circuit coupled to the comparator to provide a last boost value for use in a buck mode after a boost-to-buck transition In another aspect, a power management circuit is disclosed. The power management circuit includes a direct current DC-DC converter, a current feedback loop for the DC-DC converter having an output node, a voltage feedback loop for the DC-DC converter coupled to a common output node, a comparator coupled to the output node, a reference voltage, and the DC-DC converter, and a filter comprising an inductor and a capacitor, wherein the current feedback loop is configured to measure a voltage drop across the inductor and integrate a current derived from the voltage drop.

In another aspect, a method of controlling a power management circuit is disclosed. The method includes sensing a voltage at an output node and sensing a current proximate the output node. The method also includes summing a first current based on a sensed current and a second current based on a sensed voltage into a summed current, using a sample and hold circuit to provide a ramp compensation signal, and summing the ramp compensation signal with the summed current.

DETAILED DESCRIPTION

Figure 1A:
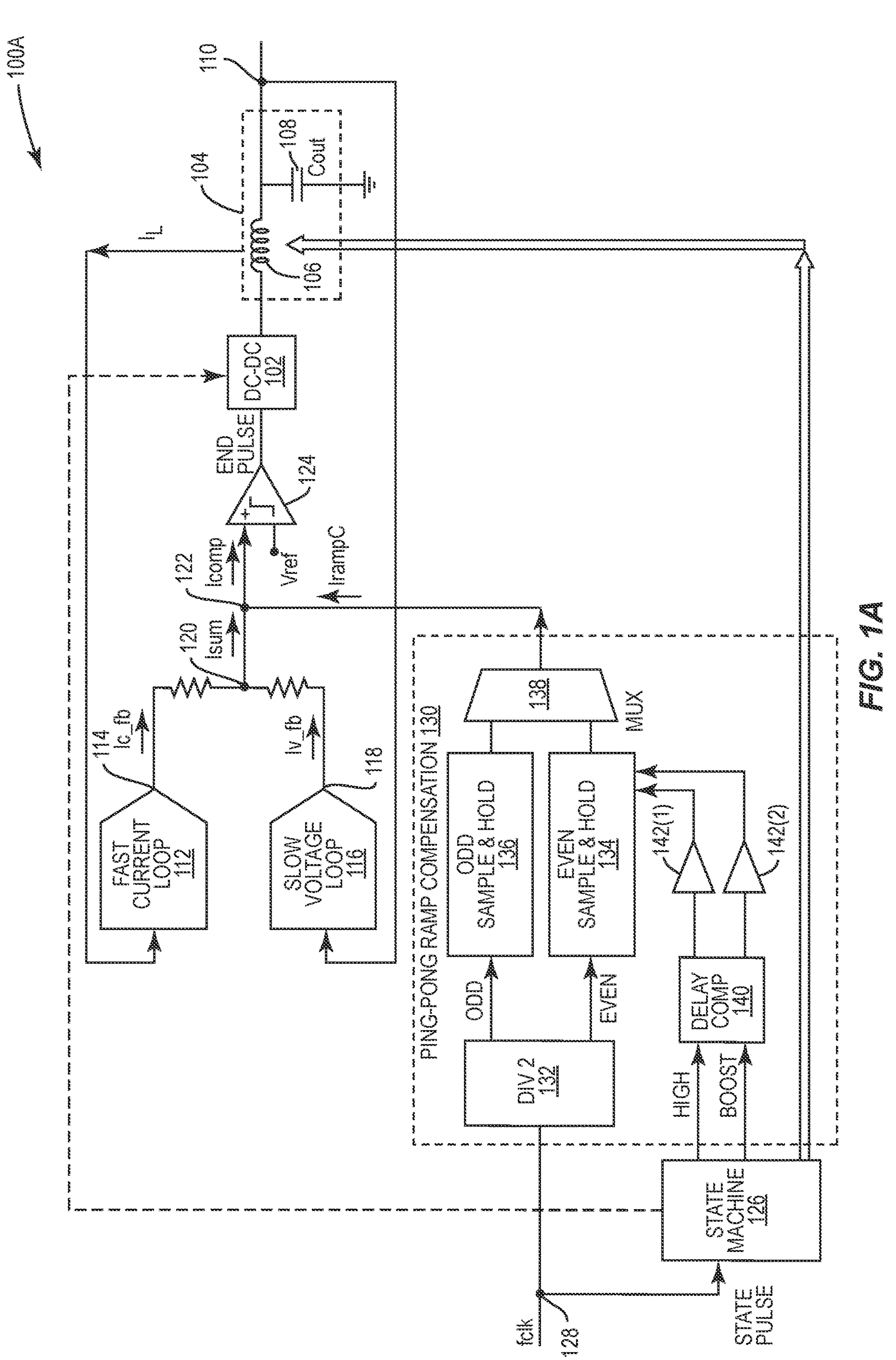
FIG. 1A is a block diagram of an exemplary power management circuit with a direct current-to-direct current (DC-DC) converter having a ping-ping ramp compensation circuit coupled to a comparison input according to a first aspect of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms first, second, etc. may be used herein to describe various elements, these elements should not be limited by these terms. These terms are only used to distinguish one element from another. For example, a first element could be termed a second element, and similarly, a second element could be termed a first element without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, no intervening elements are present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, no intervening elements are present. It will also be understood that when an element is referred to as being "connected" or "coupled" to another element, it can be directly connected or coupled to the other element or intervening elements may be present. In contrast, when an element is referred to as being "directly connected" or "directly coupled" to another element, no intervening elements are present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include systems and methods for improving efficiency in a power management circuit. In particular, a first aspect incorporates a ping-pong sample and hold circuit to smooth transitions from buck to boost (and vice versa) modes of operation for a direct current-to-direct current (DC-DC) converter in the power management circuit. The ping-pong sample and hold circuit provides a ramp compensation for each clock cycle, where transitions are smoothed by holding the last value used from the previous mode of operation. In a second aspect, a current sensor is used that integrates a current value to provide a base feedback loop for the DC-DC converter and may use various compensation factors to provide a proper ramp signal for the DC-DC converter.

Before addressing exemplary aspects of the present disclosure, a brief discussion of existing power management circuits and their challenges is provided. Power management circuits may be used with power amplifier chains in transceivers, such as can be found in mobile terminals like cell phones and the like. Such power management circuits may include DC-DC converters that operate in buck and boost modes to lower or raise DC voltage levels to desired levels relative to a battery voltage. Such buck-boost converters are well-known in the industry. Many such buck-boost converters include current feedback loops and/or voltage feedback loops to assist in providing a smooth output signal for the DC-DC converter.

However, these feedback loops have challenges. A voltage feedback loop may be bandwidth-limited and have slow settling. Current-mode control through a current feedback loop may increase bandwidth, but measuring current with a series resistor at an output may degrade efficiency. Likewise, measuring current with switch sensors may result in multiple sensors, one for each switching path, which in turn adds complexity. There may be overshoot or ringing even with such feedback circuits due to current change disturbances. Such overshoot situations may be exacerbated when the circuit uses a duty cycle greater than fifty percent. The difficulties of the duty cycle are well-documented in the industry.

Exemplary aspects of the present disclosure provide options for assisting in providing smooth ramp compensation for a DC-DC converter that may be used in a power management circuit. By providing for smooth ramp compensation, the power management circuit is made more efficient, which may improve time to recharge metrics for batteries for mobile devices and thus improve user experience. In particular, exemplary aspects of the present disclosure contemplate a ping-pong ramp compensation circuit that shares a clock signal used by the DC-DC converter to sample and hold values provided to the DC-DC converter and use the held values when the DC-DC converter changes operation modes. The use of the held values prevents a discontinuity and speeds settling time while reducing ringing. Still, further aspects of the present disclosure provide improved current and voltage sensors to assist in determining ramp compensation cycles. In particular, a current integrator may be used to assist in determining a current value.

The present disclosure presents the ping-pong compensation circuit first. In this regard, FIG. 1A is a block diagram of a power management circuit 100A having a DC-DC converter 102. The DC-to-DC converter is coupled to an output filter 104 having an inductor 106 and a capacitor 108. Both the inductor 106 and the capacitor 108 couple to an output node 110. Current may be measured across the inductor 106 to provide a signal IL for a fast current loop circuit 112. The fast current loop circuit 112 provides a current feedback signal $I_{c\_fb}$ at an output 114. Similarly, voltage at the output node 110 may be measured and used by a slow voltage loop circuit 116. The slow voltage loop circuit 116 may provide a current $I_{v\_fb}$ at an output 118. The currents $I_{c\_fb}$ and $I_{v\_fb}$ are summed at a node 120 and form an uncompensated signal $I_{sum}$ to node 122.

Node 122 also couples to a comparator circuit 124 that compares a compensated signal (Icomp) arriving from node 122 to a reference signal (Vref) to provide an end pulse signal to the DC-DC converter 102. The DC-DC converter 102 receives a start pulse signal from a state machine 126 that is based on a clock signal (fclk) arriving at a node 128.

Node 122 and node 128 also couple to a ping-pong ramp compensation circuit 130. The ping-pong ramp compensation circuit 130 includes a divide by two (Div. 2) circuit 132 that divides the clock signal into even and odd pulses. The even pulses are provided to an even sample and hold circuit 134, while the odd pulses are provided to an odd sample and hold circuit 136. While not shown, the sample and hold circuits 134, 136 sample the ramp compensation signal at node 122 and store for future use as explained below. The sample and hold circuits 134, 136 are coupled to a multiplexer 138. The multiplexer 138 selects a signal from one of the sample and hold circuits 134, 136 (or no signal) and injects the same at node 122 (e.g., signal IrampC). To ensure that any injected signal is properly aligned, a delay compensation circuit 140 is provided along with level shifters 142(1), 142(2). The delay compensation circuitry 140 may be an inverter string with loading capacitance, for example.

As noted above, in the absence of the present disclosure, the DC-DC converter 102 may be unstable, where the instability is caused by a slope of the falling edge of the feedback current exceeding a slope of the steady-state inductor current. This difference makes the error from a perturbation in the current controlled loop grow. It should be appreciated that this instability occurs only in current feedback converters operated in common current mode (CCM) with a duty cycle greater than 50%. To improve stability, the slope of the feedback current (i.e., the fast feedback loop that operates cycle to cycle) may be reduced. This reduction may be made by adding a compensation current based on the switching frequency. This compensation circuit reduces the slope of the falling edge of the feedback current such that an error created by a perturbation in the current feedback loop will decrease in time. The ping-pong ramp compensation circuit 130 is such a compensation circuit with the signal provided to node 122 acting to reduce the slope of the falling edge of the feedback current.

In particular, the ping-pong ramp compensation circuit 130 reduces errors from a reset time of the ramp and reduces overshoot when large duty-cycle changes happen from cycle to cycle (e.g., buck high DC to boost low DC transition). The ping-pong ramp compensation circuit 130 may act in a variety of states, including:

For buck or boost operation with a duty cycle below 50%, no ramp compensation is needed, and the ping-pong ramp compensation circuit 130 may be dormant.

Ramp compensation may be needed for buck or boost operation with a duty cycle above 50%.

When ramp compensation is done, it is done every switching cycle. Thus, sharing the clock signal makes it easy to do every switching cycle. Note also that there may be a discontinuity in the ramp when going from a large duty cycle (e.g., buck mode at a higher output voltage) to a lower duty cycle (e.g., boost mode after getting above a battery level), and this discontinuity may contribute to overshoot. The ping-pong ramp compensation circuit 130 reduces the discontinuity in ramp compensation at the boundary between high-duty and low-duty cycles, specifically by saving the ramp compensation value for the last buck operating cycle in the circuit 134 (or 136) and applied in the first boost cycle. After the transition, the duty cycle in most boost modes is low, so ramp compensation may be discontinued or gradually reduced to help avoid overshoot.

Figure 1B:
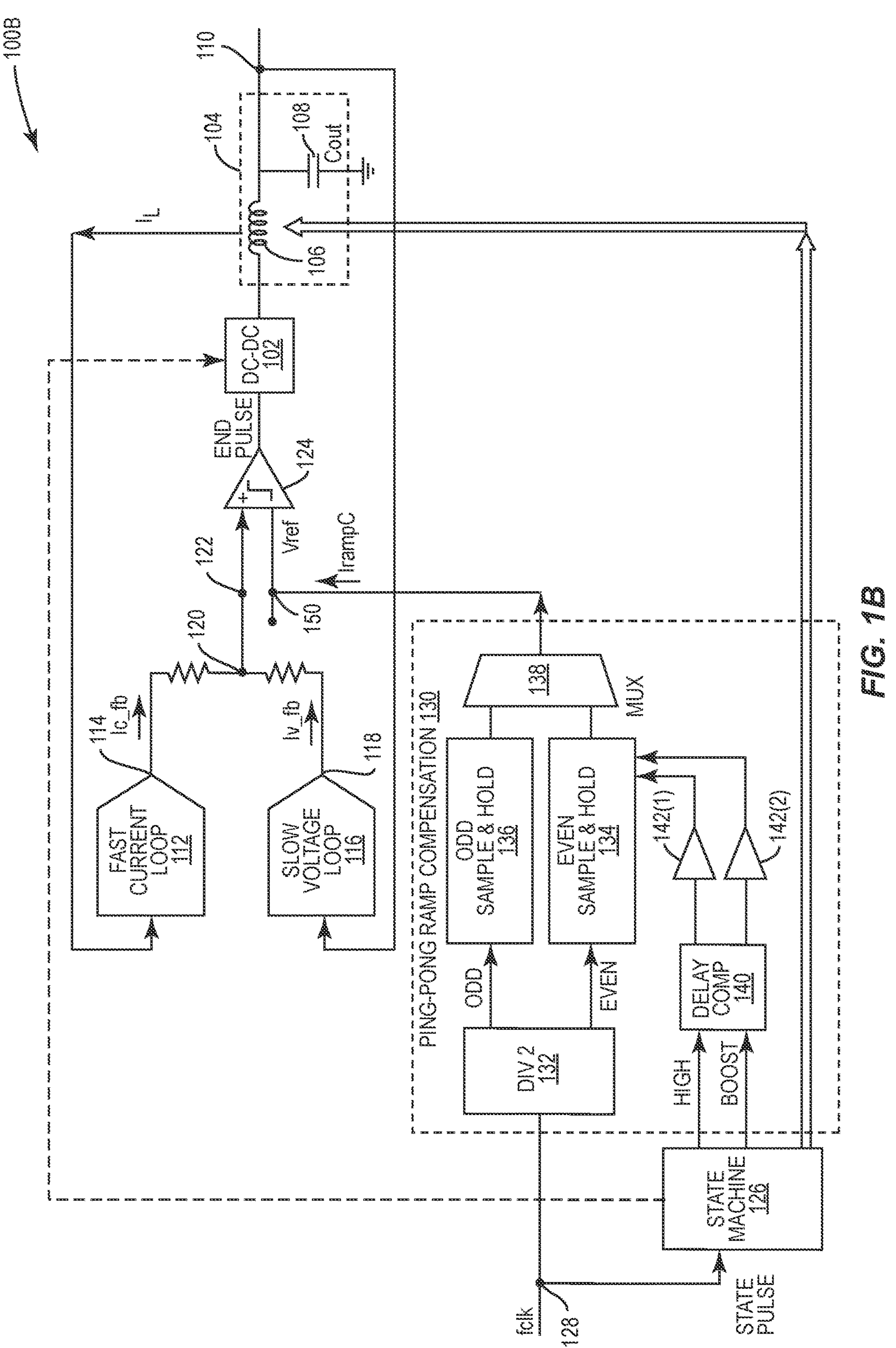
FIG. 1B is a block diagram of an exemplary power management circuit with a DC-DC converter having a ping-pong ramp compensation circuit coupled to a comparator at a reference input according to a second aspect of the present disclosure.

It should be appreciated that the compensation signal may be applied at node 122, as shown in FIG. 1A, but the compensation signal may also be applied at the reference input node 150 of the comparator, as is better seen in FIG. 1B. In most other aspects, the power management circuit 100B is nearly identical to circuit 100A of FIG. 1A.

Figure 2:
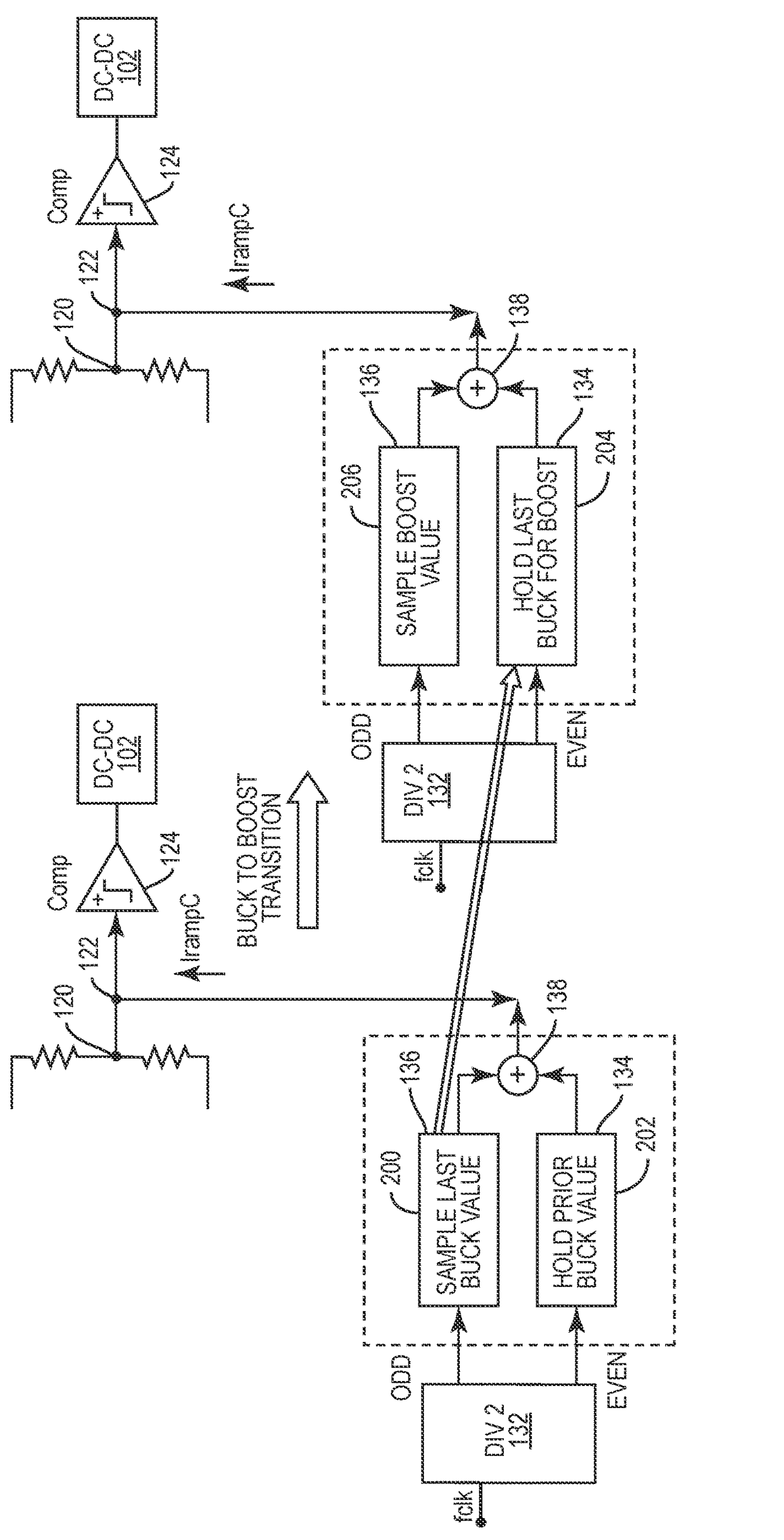
FIG. 2 is a block diagram of parts of the ping-pong ramp compensation circuit at two different temporal times, highlighting a sample and hold function within the circuit.

FIG. 2 provides an illustration of how the sample and hold circuits 134, 136 may sample, for example, a last buck value (generally at 200 in circuit 136) while a prior buck value is held at circuit 134 (generally at 202). The value in the circuit 136 is updated at each sample, moving the immediately prior last value to the circuit 134. When there is a transition to a boost mode, the value in the circuit 134 (generally at 204) is output through the MUX 138 to node 122 to assist in making the transition smooth and without a discontinuity. Concurrently, the boost value may be sampled and stored in the circuit 134 (generally at 206).

Figure 3:
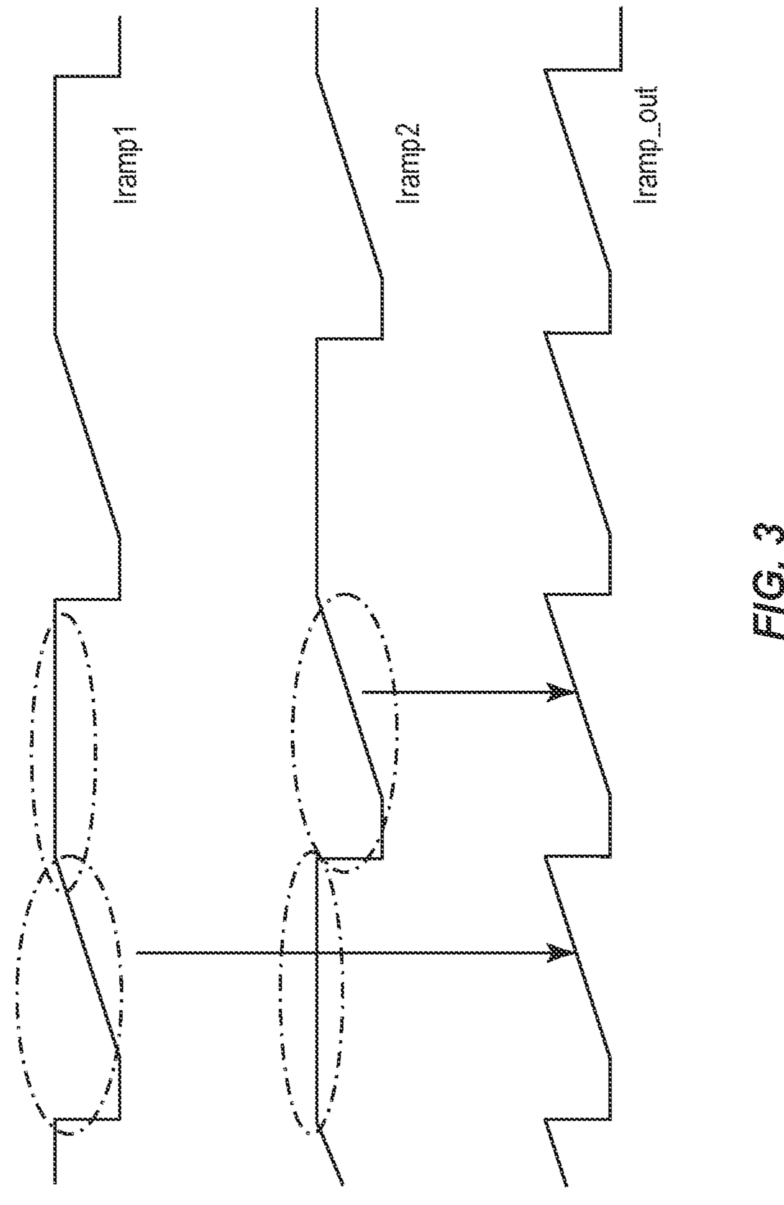
FIG. 3 is a graph of various currents versus time, highlighting how the sample and hold function provides a first value after handoff.

Such an approach may lead to the signals seen in FIG. 3, where Iramp1 may correspond to the buck signal that is sampled and held, and Iramp2 is the boost signal that is sampled and held. Iramp_out shows the relatively smooth transitions that are achieved when the last value is used as the first value of the new mode. Additional details about the circuit may be found below with reference to FIG. 8.

Figure 4:
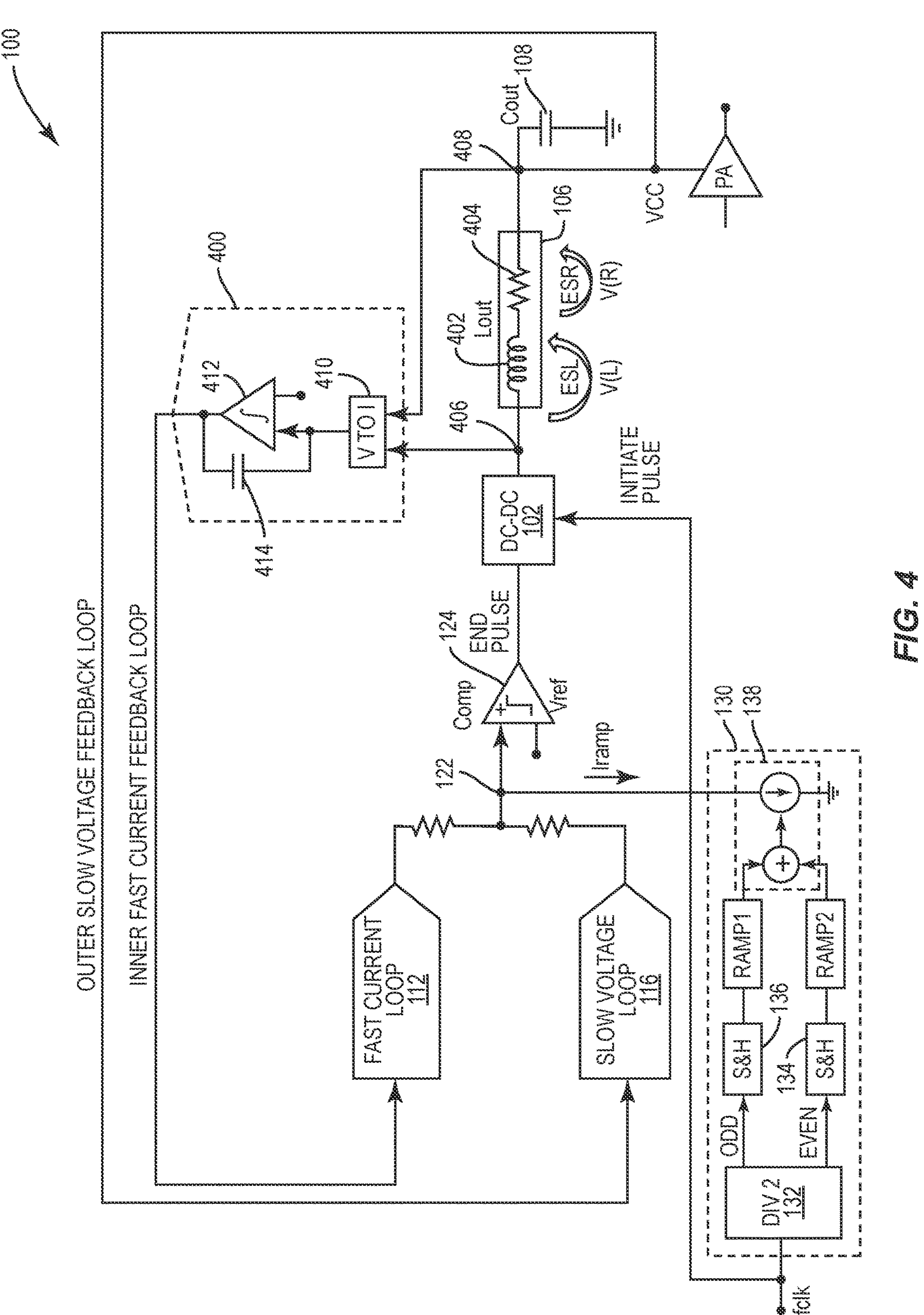
FIG. 4 is a hybrid block and circuit diagram showing a current-based current sensor used by a current feedback loop of the power management circuit.

While the ping-pong ramp compensation circuit 130 provides improvements to the ramp compensation circuit that improves efficiency, there is also room for improvements to the sensors used to make the measurements for the current feedback loop and the voltage feedback loop, as better illustrated through FIGS. 4-7. In this regard, FIG. 4 illustrates one possible current sensor 400 associated with a power management circuit 100. The current sensor 400 measures a voltage drop across the inductor 106 and particularly across its effective series inductance 402 and its effective series resistance 404 (e.g., across nodes 406, 408). This voltage drop is converted to a current by conversion circuitry 410 and integrated by an integrator 412. The integrator 412 may have a parallel capacitor 414.

Figure 5:
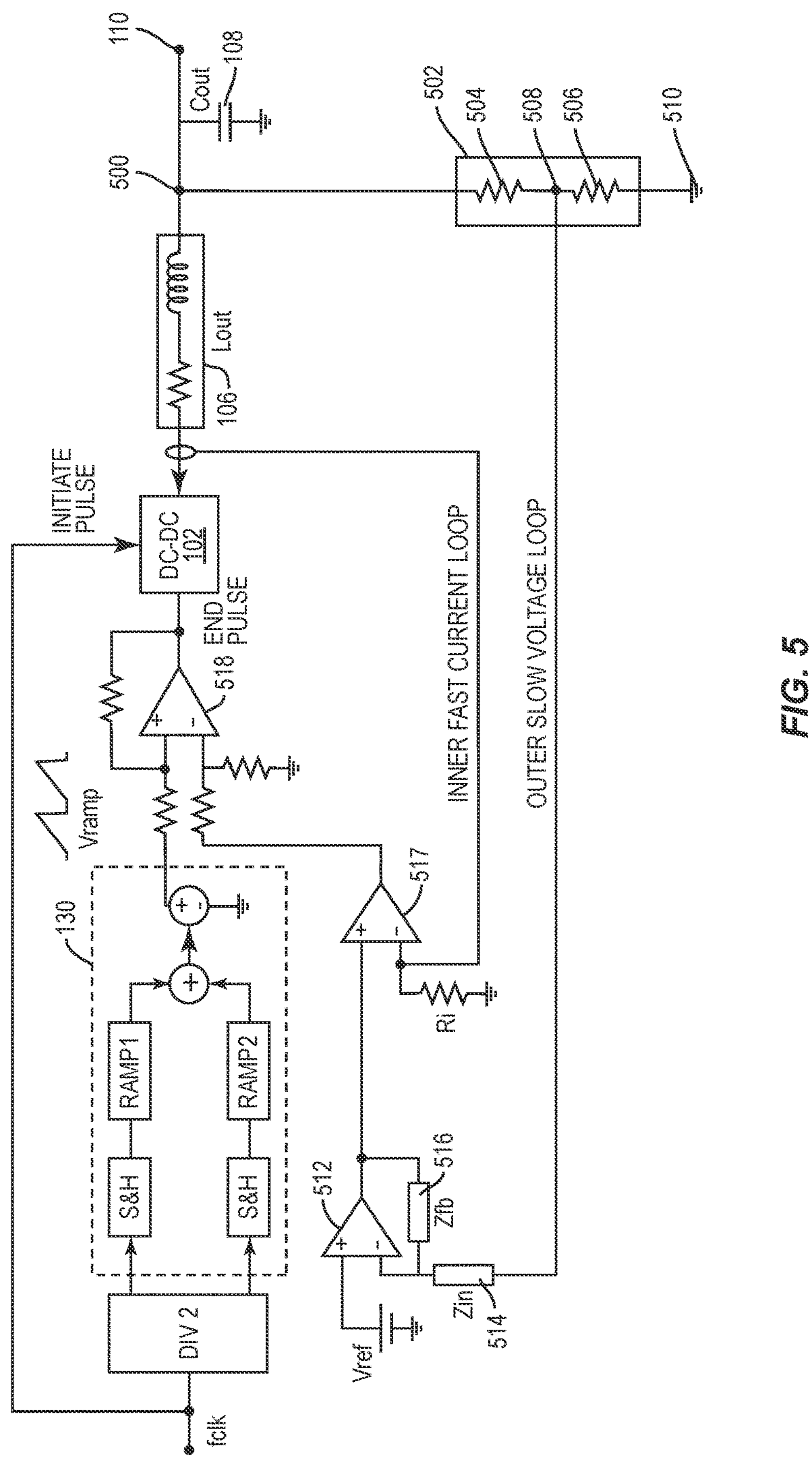
FIG. 5 is a hybrid block and circuit diagram showing a voltage-based current sensor and voltage sensor used by a current feedback loop and a voltage feedback loop of the power management circuit.

Voltage sensing is perhaps slightly more complex for the slow voltage loop circuit 116. More details about such a loop are shown in FIG. 5, where a voltage is measured at node 500 between the inductor 106 and the capacitor 108. A voltage divider 502 formed from resistors 504, 506 has a central node 508 to provide the voltage division with resistor 506 coupled to ground 510. The node 508 couples to an operational amplifier (op-amp) 512 with associated input impedance 514 and feedback impedance 516. The output of the op-amp 512 may be coupled to a fast current feedback loop at an input to a second op-amp 517. Still another op-amp 518 may couple to the DC-DC converter 102 to provide the feedback. The op-amp 518 may also be coupled to the ping-pong ramp compensation circuit 130.

Figure 6:
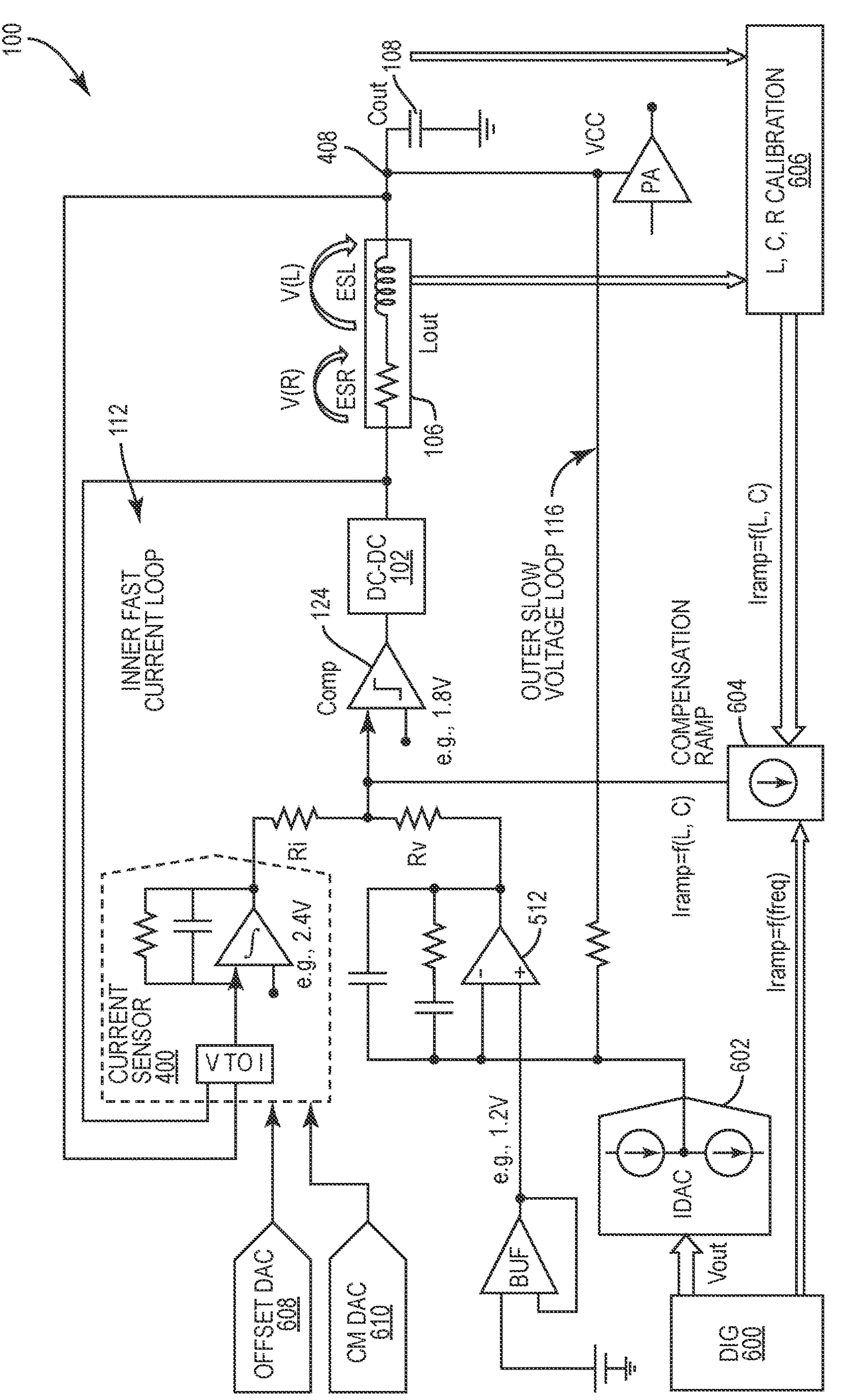
FIG. 6 is a more detailed version of the power management circuit of FIG. 4 with a voltage feedback loop added and various compensation elements to assist in ramp compensation.

As still another variation, there may be a digital control with multiple calibration inputs for various elements within the loop circuits 112, 116, as better seen in FIG. 6. Specifically, a digital controller 600 may control a current DAC 602, which provides an input to the op-amp 512 of the slow voltage loop circuit 116. The digital controller 600 may also provide a control signal for a ramp compensation circuit 604. Ramp compensation circuit 604 may be a ping-pong ramp compensation circuit as previously described or another circuit as needed or desired. The ramp compensation circuit 604 may also receive calibration values for the inductor 106, the capacitor 108, and/or any relevant resistors from a memory or sensor 606. Additionally, the current sensor 400 may be coupled to one or more compensation or offset DACs 608, 610. The reason for the calibration values and the DACs 608, 610 is that most components are not "true" to a specified value. Process variations or manufacturing tolerances may lead to variations between elements. Likewise, various seemingly small but real values and non-trivial parameters may be changed, such as conductor length, conductor width, or the like. Parasitic capacitances or the like may also impact performance. Such variations may be addressed through calibration and/or the DACs 608, 610.

Figure 7:
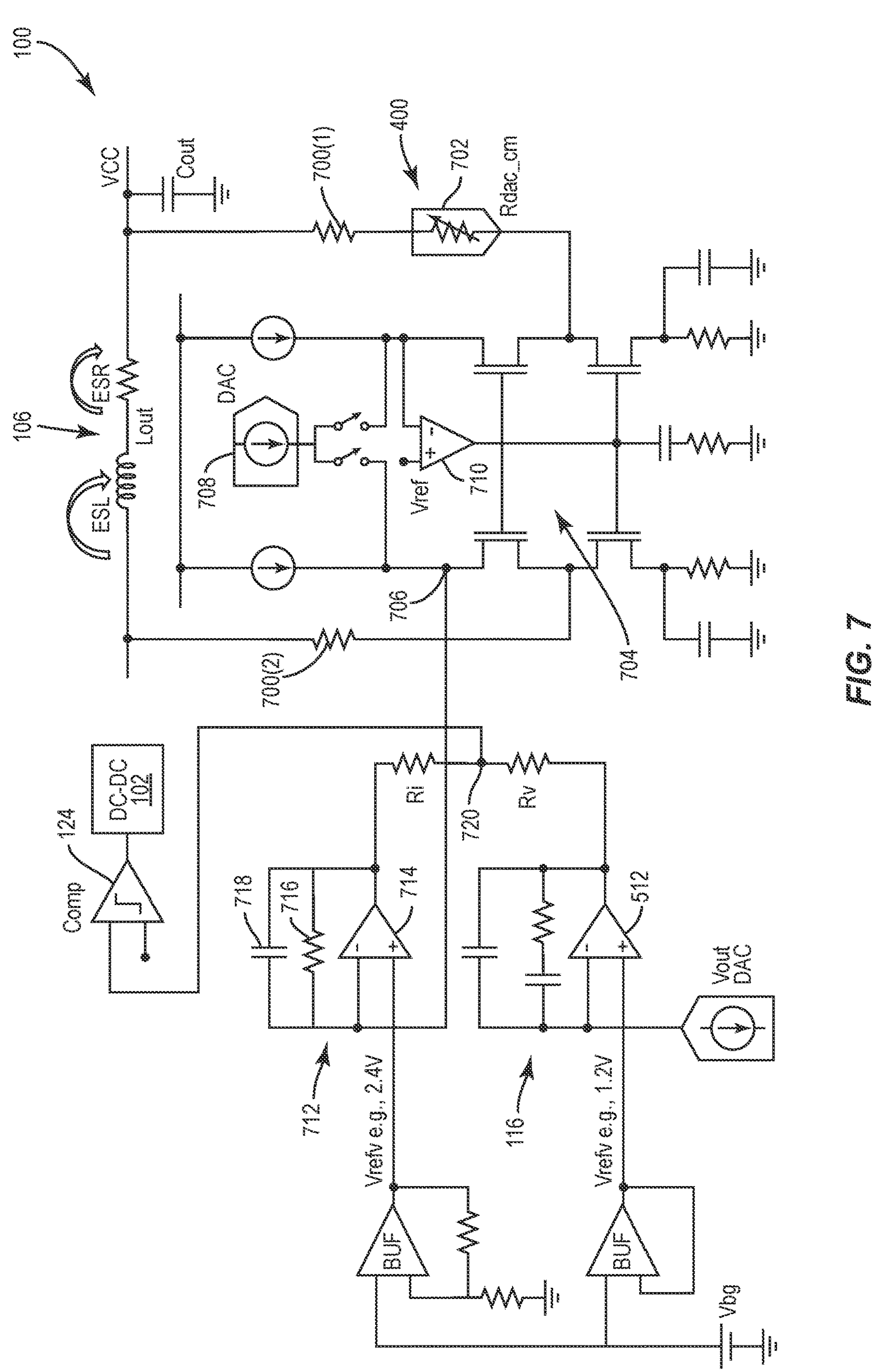
FIG. 7 is a hybrid block and circuit diagram of a current sensor and integrator to provide additional details of the power management circuit of FIG. 4.

FIG. 7 provides additional details about the current sensor 400. Specifically, the current sensor 400 may sense a differential voltage across the inductor 106 with two high-value resistors 700(1), 700(2). To assist in addressing device mismatches and variations (process variation, temperature variation, etc.), a resistor DAC 702 is provided and may provide differential offset correction. A feedback current mirror 704 converts the two currents into a single-ended current at output node 706. A current DAC 708 is also provided for the feedback current mirror 704 for mirror common mode offset correction. In operation, both sides of the feedback current mirror 704 go to low-impedance nodes created by the inverting input of a feedback amplifier 710. The single-ended current representing the inductor voltage (i.e., the value at node 706) is injected into an integrator 712, which in this example is an op-amp 714 with feedback resistor 716 and feedback capacitor 718. The output node 720 is coupled to the voltage loop circuit 116 and coupled to the comparator circuit 124 as previously described.

Figure 8:
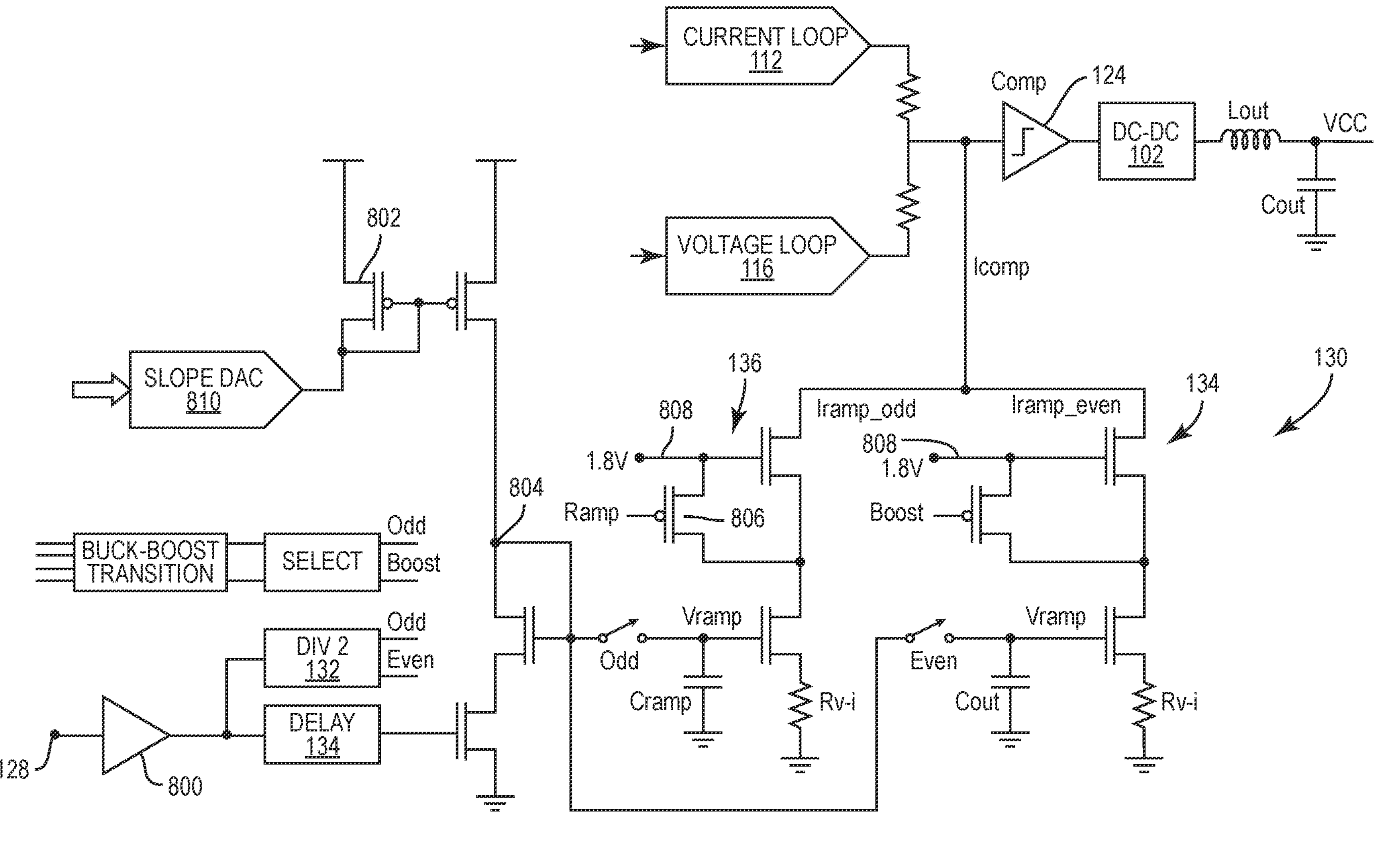
FIG. 8 is a more detailed diagram of a ping-pong sample and hold circuit for use with a power management circuit.

FIG. 8 provides additional details about the sample and hold circuits that smooth out the buck to boost transition. In particular, the ping-pong ramp compensation circuit 130 may have two ramp generators, one operating on the odd periods and one operating on the even periods. To initiate the ramp, a fractional clock circuit 800 may divide the original clock frequency (folk) into a fractional value (e.g., 25%). The ramp section of the circuit saves the last current in the buck mode and adds it to the current in the boost mode. To cancel a threshold voltage of field effect transistors (FETs) in the circuitry, a diode-connected device 802 is connected at an input 804. This allows the ramp circuit output transconductance stage to be active starting from the beginning of the ramp. To prevent saturation of the output transconductance stage when the drain is not connected at the input of the comparator (e.g., during the sampling phase), a current steering FET 806 is used to route the current at the 1.8 V supply line 808. This current steering eliminates spikes when the ramp output circuit is connected to the comparator circuit 124 input. A slope adjustment DAC 810 may be used to help ensure correction for variations (e.g., process, temperature, etc.).

Figure 9:
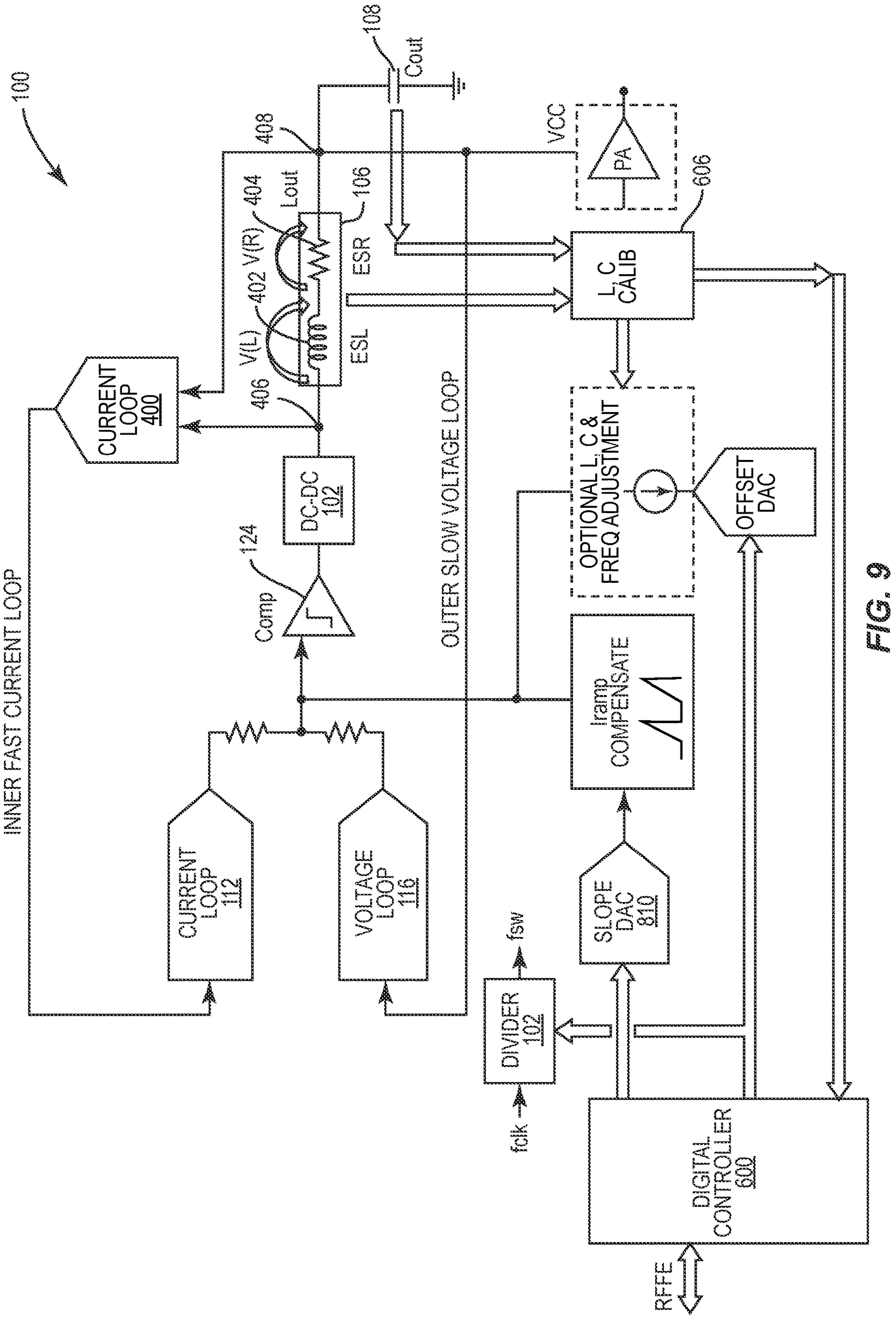
FIG. 9 and FIG. 10 illustrate alternate circuit layouts for exemplary aspects of the present disclosure.
Figure 10:
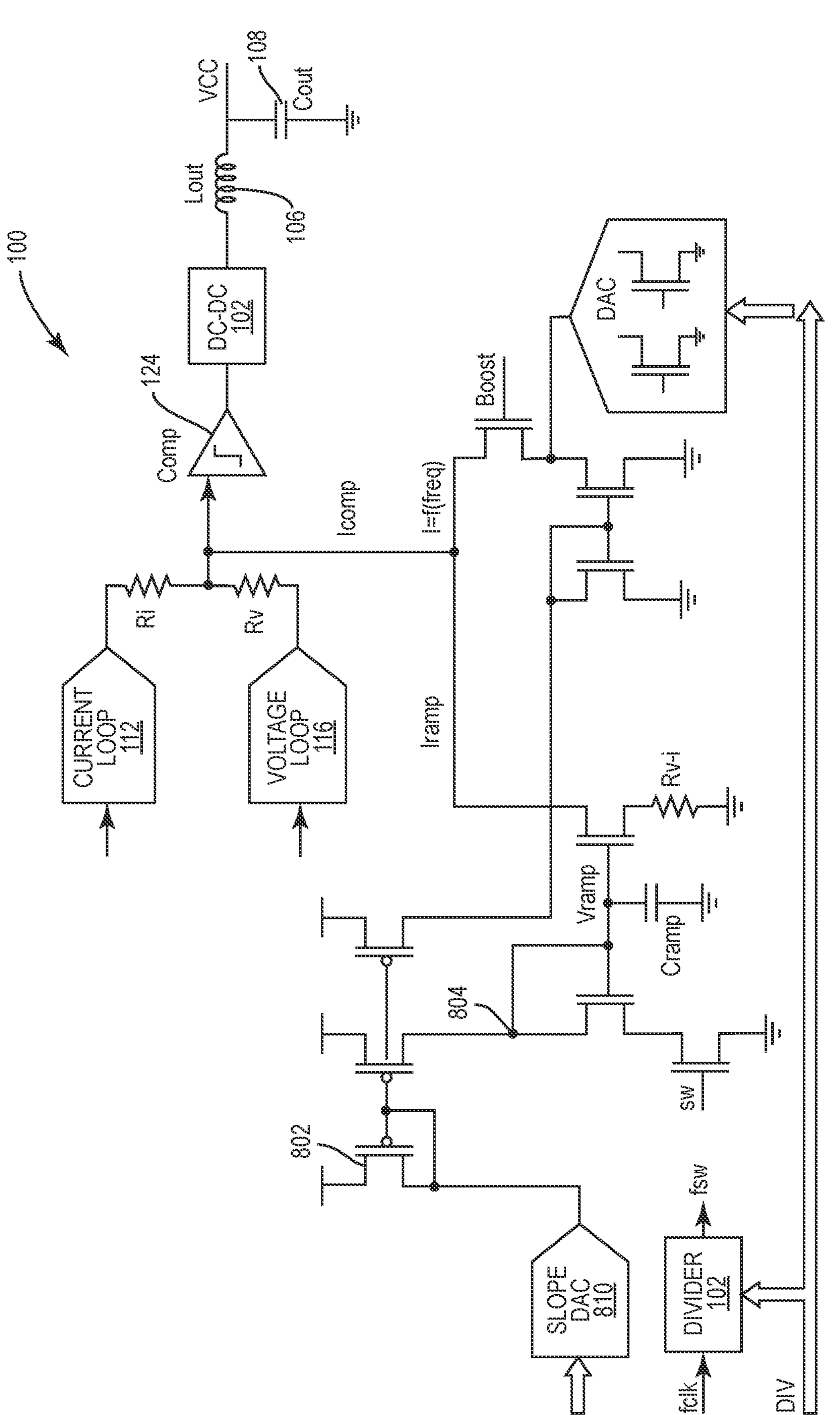

FIGS. 9 and 10 provide alternate circuit layouts to implement aspects of the present disclosure and are included for completeness; however, as many of the elements are duplicative, a detailed discussion is foregone.

Figure 11:
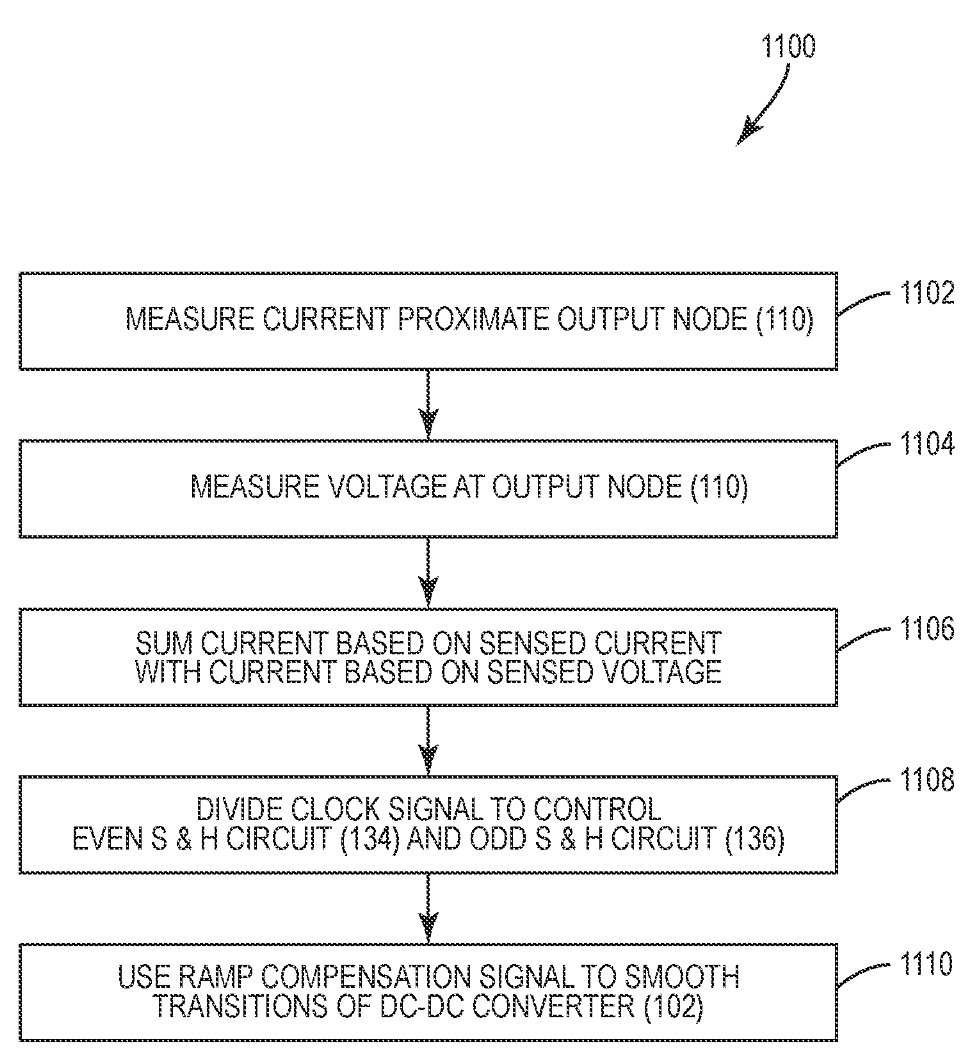
FIG. 11 is a flowchart illustrating a method of operating a power management circuit according to aspects of the present disclosure.

A process 1100 is illustrated in FIG. 11, describing how the ram power management circuit 100 may be managed. In particular, the process 1100 begins by measuring current proximate an output node 110 (block 1102) (e.g., across the inductor 106). Voltage is measured at the output node 110 (block 1104).

A current based on the sensed current is summed with a current based on the sensed voltage (block 1106). A clock signal is divided to control an even sample and hold circuit 134 and an odd sample and hold circuit 136 (block 1108) that holds a last ramp compensation signal. Use the ramp compensation signal to smooth transitions by a DC-DC converter 102 (block 1110).

Figure 12:
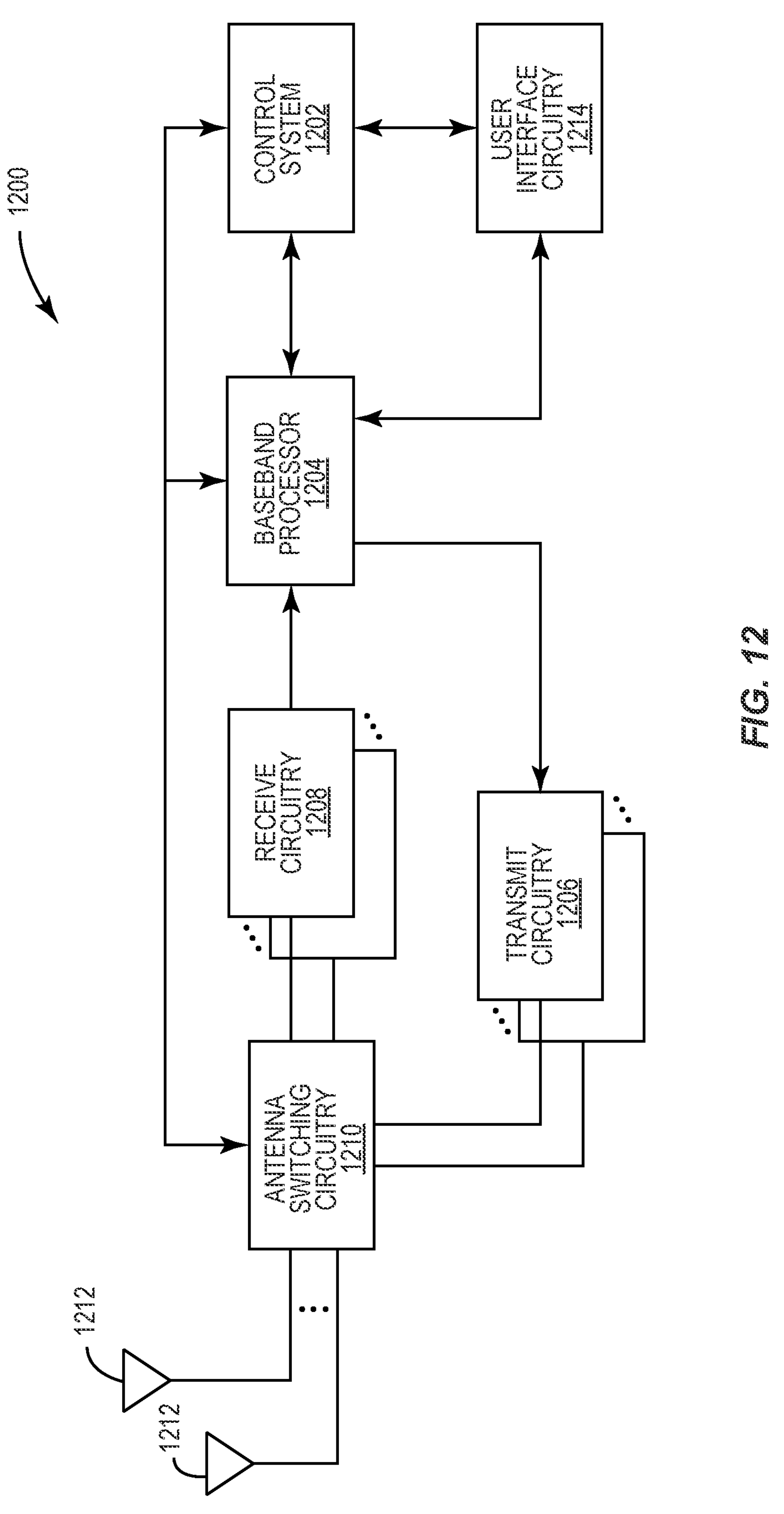
FIG. 12 is a block diagram of a mobile terminal, which may include the power management circuit with efficient ramp compensation according to the present disclosure.

With reference to FIG. 12, the power management circuits with ping-pong ramp compensation circuits and improved current sensors described above may be implemented in various types of user elements 1200, such as mobile terminals, smart watches, tablets, computers, navigation devices, access points, and like wireless communication devices that support wireless communications, such as cellular, wireless local area network (WLAN), Bluetooth, and near field communications. The user elements 1200 will generally include a control system 1202, a baseband processor 1204, transmit circuitry 1206, receive circuitry 1208, antenna switching circuitry 1210, multiple antennas 1212, and user interface circuitry 1214. In a non-limiting example, the control system 1202 can be a field-programmable gate array (FPGA) or an application-specific integrated circuit (ASIC), as an example. In this regard, the control system 1202 can include at least a microprocessor(s), an embedded memory circuit(s), and a communication bus interface(s). The receive circuitry 1208 receives radio frequency signals via the antennas 1212 and through the antenna switching circuitry 1210 from one or more base stations. A low noise amplifier and a filter of the receive circuitry 1208 cooperate to amplify and remove broadband interference from the received signal for processing. Downconversion and digitization circuitry (not shown) will then down convert the filtered, received signal to an intermediate or baseband frequency signal, which is then digitized into one or more digital streams using analog-to-digital converter(s) (ADC).

The baseband processor 1204 processes the digitized received signal to extract the information or data bits conveyed in the received signal. This processing typically comprises demodulation, decoding, and error correction operations, as will be discussed in greater detail below. The baseband processor 1204 is generally implemented in one or more digital signal processors (DSPs) and application-specific integrated circuits (ASICs).

For transmission, the baseband processor 1204 receives digitized data, which may represent voice, data, or control information, from the control system 1202, which it encodes for transmission. The encoded data is output to the transmit circuitry 1206, where a DAC converts the digitally encoded data into an analog signal, and a modulator modulates the analog signal onto a carrier signal that is at a desired transmit frequency or frequencies. A power amplifier that is generally controlled by a power management circuit according to exemplary aspects will amplify the modulated carrier signal to a level appropriate for transmission and deliver the modulated carrier signal to the antennas 40 through the antenna switching circuitry 1210 to the antennas 1212. The multiple antennas 1212 and the replicated transmit and receive circuitries 1206, 1208 may provide spatial diversity. Modulation and processing details will be understood by those skilled in the art.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A power management circuit comprising:
- a direct current (DC)-to-DC (DC-DC) converter;
- a current feedback loop for the DC-DC converter having an output node;
- a voltage feedback loop for the DC-DC converter coupled to a common output node;
- a comparator coupled to the output node, a reference voltage, and the DC-DC converter; and
- a ping-pong ramp compensation circuit coupled to the comparator to provide a last boost value for use in a buck mode after a boost-to-buck transition.

2. The power management circuit of claim 1, further comprising a filter coupled to an output of the DC-DC converter.

3. The power management circuit of claim 2, wherein the filter comprises an inductor.

4. The power management circuit of claim 3, wherein the current feedback loop is configured to measure a voltage drop across the inductor.

5. The power management circuit of claim 4, wherein the current feedback loop comprises a voltage to current circuit and a current integrator circuit.

6. The power management circuit of claim 4, wherein the current feedback loop comprises an operational amplifier.

7. The power management circuit of claim 1, wherein the voltage feedback loop comprises an operational amplifier.

8. The power management circuit of claim 1, further comprising a calibration circuit coupled to the ping-pong ramp compensation circuit.

9. The power management circuit of claim 1, wherein the ping-pong ramp compensation circuit comprises a sample and hold circuit.

10. The power management circuit of claim 1, wherein the ping-pong ramp compensation circuit is coupled to the common output node.

11. The power management circuit of claim 1, wherein the ping-pong ramp compensation circuit is coupled to a reference input of the comparator.

12. The power management circuit of claim 1, wherein the comparator comprises an output latch and a one-shot circuit configured to prevent the comparator from tripping around a clock edge.

* * * * *